United States Patent
Lu et al.

(10) Patent No.: US 10,248,530 B2
(45) Date of Patent: Apr. 2, 2019

(54) METHODS AND SYSTEMS FOR DETERMINING CAPACITY

(71) Applicant: Comcast Cable Communications, LLC, Philadelphia, PA (US)

(72) Inventors: Lichia Lu, Wayne, PA (US); Qi Wang, Holland, PA (US); Ningxiang Yuan, Shanghai (CN)

(73) Assignee: Comcast Cable Communications, LLC, Philadelphia, PA (US)

(*) Notice: Subject to any disclaimer, the term of this patent is extended or adjusted under 35 U.S.C. 154(b) by 429 days.

(21) Appl. No.: 14/795,333

(22) Filed: Jul. 9, 2015

(65) Prior Publication Data

US 2017/0010947 A1    Jan. 12, 2017

(51) Int. Cl.
G06F 11/30 (2006.01)
G06F 11/34 (2006.01)

(52) U.S. Cl.
CPC ...... *G06F 11/3409* (2013.01); *G06F 11/3006* (2013.01)

(58) Field of Classification Search
None
See application file for complete search history.

(56) References Cited

U.S. PATENT DOCUMENTS

| | | | | |
|---|---|---|---|---|
| 5,854,795 A * | 12/1998 | Osano | ............... | G11C 29/08 365/201 |
| 5,926,008 A * | 7/1999 | Palanisamy | ........ | G01R 31/3648 320/132 |
| 6,215,312 B1 * | 4/2001 | Hoenig | ............... | G01R 31/2853 324/427 |
| 8,200,208 B1 * | 6/2012 | Yang | ............... | H04W 24/06 455/422.1 |
| 8,250,198 B2 * | 8/2012 | Zhang | ............... | G06Q 10/06 709/200 |
| 8,612,578 B2 * | 12/2013 | Ricketts | ............... | H04L 41/0896 703/22 |
| 8,838,495 B2 * | 9/2014 | Kittelsen | ............... | G06Q 40/04 705/35 |
| 9,143,409 B2 * | 9/2015 | Laufer | ............... | H04L 41/14 |
| 9,886,410 B1 * | 2/2018 | Davis | ............... | G06F 13/4221 |
| 2003/0167195 A1 * | 9/2003 | Fernandes | ........ | G06Q 10/06311 705/7.13 |
| 2005/0018611 A1 * | 1/2005 | Chan | ............... | H04L 41/147 370/241 |
| 2006/0161884 A1 * | 7/2006 | Lubrecht | ............... | G06F 11/3442 717/104 |

(Continued)

*Primary Examiner* — Michael Lebentritt
(74) *Attorney, Agent, or Firm* — Ballard Spahr LLP

(57) ABSTRACT

Methods and system are provided for determining a maximum number of users of a system or network. A system capacity can be determined by performing a plurality of capacity tests. Each capacity test of the plurality of capacity tests can produce capacity test results that can be used to define a region of the system capacity from which the system capacity can be selected based on network conditions. The system capacity can be used to determine a user capacity of the system which can indicate the maximum number of users that can be active at any given time on the system. The system capacity can be used with a percentage weight of a plurality of user events performed on the system by active users to determine the maximum number of users.

20 Claims, 6 Drawing Sheets

(56) References Cited

U.S. PATENT DOCUMENTS

| | | | |
|---|---|---|---|
| 2006/0178923 A1* | 8/2006 | Ricketts | G06Q 10/06 705/7.14 |
| 2006/0190243 A1* | 8/2006 | Barkai | G06F 17/30486 704/8 |
| 2006/0241931 A1* | 10/2006 | Abu el Ata | G06Q 10/00 703/27 |
| 2007/0091874 A1* | 4/2007 | Rockel | G06Q 30/04 370/352 |
| 2009/0177727 A1* | 7/2009 | Radia | G06F 9/5044 709/201 |
| 2010/0142366 A1* | 6/2010 | Bugenhagen | H04L 41/147 370/216 |
| 2011/0314145 A1* | 12/2011 | Raleigh | H04L 41/0893 709/224 |
| 2012/0096165 A1* | 4/2012 | Madduri | G06F 9/5011 709/226 |
| 2012/0185373 A1* | 7/2012 | Grody | G06Q 40/04 705/37 |
| 2013/0097673 A1* | 4/2013 | Meehan | G06Q 20/341 726/4 |
| 2013/0254294 A1* | 9/2013 | Isaksson | G06Q 10/101 709/204 |
| 2014/0143089 A1* | 5/2014 | Campos | G06Q 20/36 705/26.8 |
| 2014/0201067 A1* | 7/2014 | Lai | G06Q 20/027 705/39 |
| 2014/0215271 A1* | 7/2014 | Oh | G06F 11/3668 714/31 |
| 2015/0081560 A1* | 3/2015 | Grossman | G06Q 20/407 705/44 |
| 2015/0278813 A1* | 10/2015 | Yue | G06Q 20/405 705/44 |
| 2015/0339263 A1* | 11/2015 | Abu El Ata | G06Q 10/06 703/2 |
| 2016/0316340 A1* | 10/2016 | Zhao | H04L 67/26 |
| 2017/0010947 A1* | 1/2017 | Lu | G06F 11/3409 |
| 2017/0075705 A1* | 3/2017 | Farrell | G06F 9/44505 |

* cited by examiner

METHODS AND SYSTEMS FOR DETERMINING CAPACITY

BACKGROUND

Current system capacity tests require a large number of iterations for different types of capacity tests. The large number of iterations increases testing time. Moreover, results of each type of capacity test can only provide a one-dimensional perspective on system capacity. In addition, traditional capacity tests are often associated with transaction capacity, rather than user capacity. There is a need for methods and systems to determine system capacity in terms of transaction capacity and user capacity more efficiently. These and other shortcomings are addressed in the present disclosure.

SUMMARY

It is to be understood that both the following general description and the following detailed description are exemplary and explanatory only and are not restrictive, as claimed. Provided are methods and systems for determining a system capacity (e.g., user capacity, transaction capacity) of a system using any transactional application such as via a server, a website, banking service, encoding service, decoding service, and/or the like. Systems with transactional applications can have a system requirement or a system threshold (e.g., service level agreement (SLA)) which can define performance expectations of the system such as minimum speed at which the system will run, reliability of the system, scalability of the system, and the like. The number of transactions on the system, the rate at which the transactions are occurring, the number of users, and the like, can affect performance of the system and at some level and/or threshold cause the system to be in noncompliance with the system requirement.

In an aspect, a system capacity can be determined. The system capacity can be a threshold of the system at which the performance of the system still complies with performance expectations of a system requirement. A system capacity can be determined by performing a plurality of capacity tests (e.g., spike tests, transient tests, soak tests, steady state tests). Each capacity test produces capacity test results that can be used to define a region of system capacity. The region of system capacity can be an area bound by the plurality of capacity test results when the plurality of capacity test results is graphed. The region of system capacity can comprise system capacity candidates from which the system capacity can be selected and still comply with the system requirement but allow for maximum performance. In an aspect, the region of system capacity can be defined by a first set of capacity test results by performing a first set of capacity tests (e.g., steady state test) of the system. In an aspect, the first set of capacity tests can determine a maximum number of transactions on the system (e.g., capacity ceiling) with a minimum ramp up rate. The region of system capacity can be further defined by a second set of capacity test results that can be determined by performing a second set of capacity tests (e.g., spike test) of the system. In an aspect, the second set of capacity tests can determine the maximum number of transactions the system can perform in the least amount of time (e.g., capacity floor). The region of system capacity can be further defined by a third set of capacity test results that can be determined by performing a third set of capacity tests (e.g., transient test) of the system. In an aspect, the third set of capacity tests can determine a maximum ramp up rate that can reach the capacity ceiling. These capacity tests, when plotted on a graph, can define the region of system capacity. In an aspect, the system capacity can be described in terms of a transaction capacity.

In an aspect, one or more of the first set of capacity tests, the second set of capacity tests, and the third set of capacity tests can be calibrated based on the first set of capacity test results, the second set of capacity test results, and the third set of capacity test results. For example, the second set of capacity test results might be inconsistent with the first set of capacity tests results and therefore the system can be adjusted to get a more accurate first set of capacity test results and/or second set of capacity test results.

In an aspect, a fourth set of capacity tests can be performed to confirm the region of system capacity and/or further define the region of system capacity by using one or more respective capacity test results of the first set of capacity tests, the second set of capacity tests, and the third set of capacity tests. In an aspect, the fourth set of capacity tests can be performed using one or more of the first set of capacity test results, the second set of capacity test results, and/or the third set of capacity test results. For example, the fourth capacity test can use the maximum ramp up rate of the third set of capacity tests to reach the capacity ceiling of the first set of capacity tests and remain at the capacity ceiling for an extended amount of time to determine whether the performance of the system will still be in compliance with the system requirement. The region of system capacity determined as a result of the test results can be used to select a system capacity. The system capacity can be selected from the region of system capacity based on performance parameters defined by the system requirement (e.g. SLA).

In an aspect, the system capacity defined in terms of transaction capacity can be used to determine a system capacity in terms of a user capacity. The user capacity can indicate a maximum number of users that can be active at any given time on the system and performance of the system still complies with the system requirement, or any other threshold or network requirement. To determine the user capacity, a plurality of user events can be retrieved from user event logs from a quantity of active users that have been using the system for a given time period. A user event can be a user command and/or action on the system. Each user event can be placed in predefined categories of user events. User event distribution data can be determined based on the quantity of active users and the plurality of user events associated with the quantity of active users. In an aspect, each user event can correspond to one or more transactions. For example, a "one time recording" user event on a DVR system can result in multiple transactions on the system such as "record one shot," "get recordings," and "get recordings list." In an aspect, a user event transaction sequence for each of the quantity of active users can be determined. The user event transaction sequence can indicate a sequence of transactions for each user event category. The user event transaction sequence can also indicate a key transaction, which is a transaction that represents the user event. In an aspect, transaction distribution data can be generated based on the user event distribution data and the user event transaction sequence. The transaction distribution data can be generated by multiplying the number of user events in the user event distribution data by each user events' corresponding transactions, including the key transaction, in the user event transaction sequence. Each transaction can be sorted in predefined categories. In an aspect, the user capacity of the system (e.g., a maximum number of users associated with the system) can be determined based on the transaction distribution data. Each transaction of the transaction distribution data can be divided by the total number of transactions to determine a percentage weight of each transaction. The percentage weight can be multiplied by a transaction capacity determined by capacity tests to determine how many of the transactions can be performed at a given time. The key transactions of the transactions can be added together which can be an estimate an of the user capacity of the system.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute apart of this specification, illustrate embodiments and together with the description, serve to explain the principles of the methods and systems.

DETAILED DESCRIPTION

Figure 1:
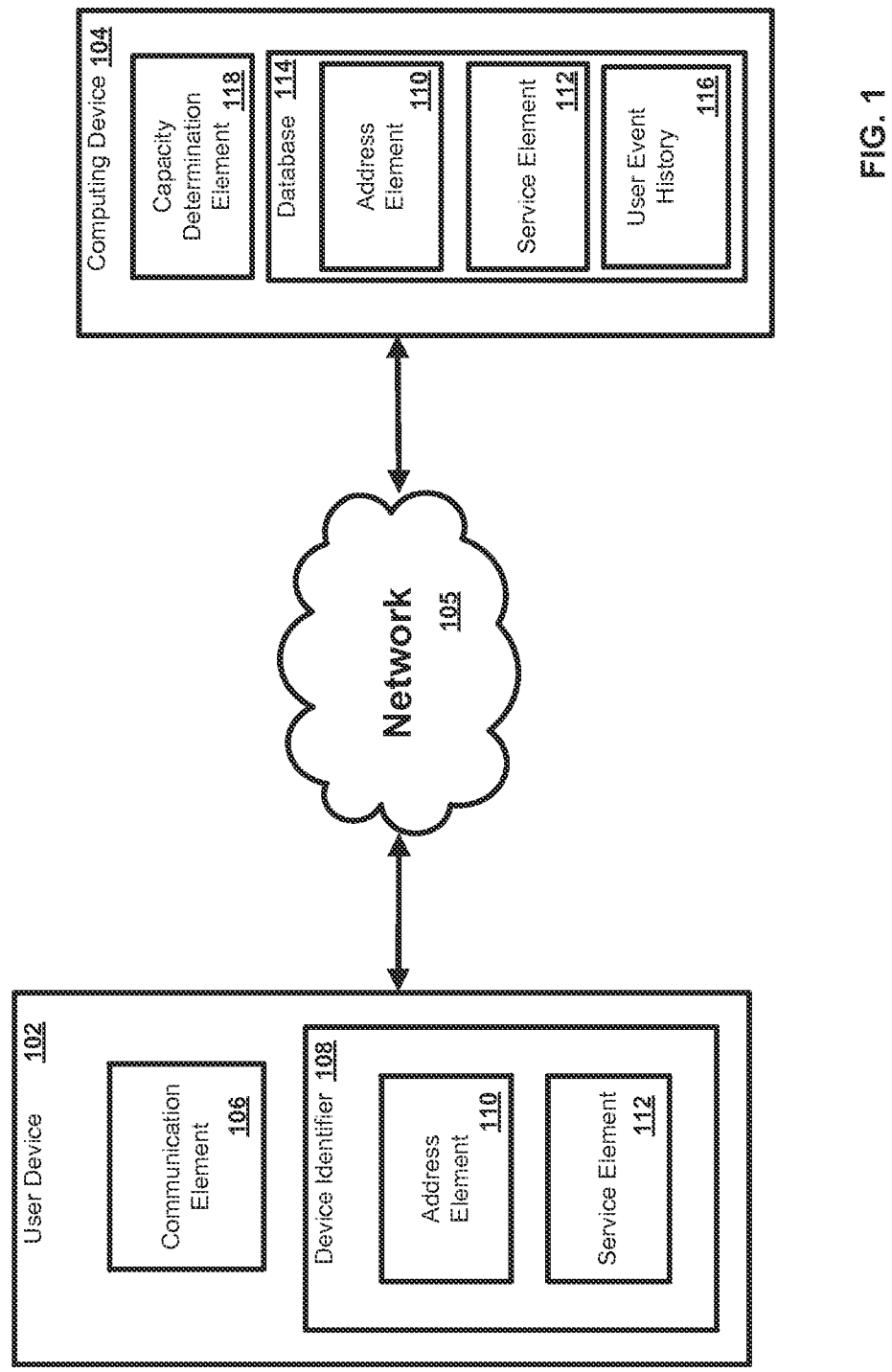
FIG. 1 illustrates various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for determining a system capacity of a system. The system capacity can comprise one or more of a transaction load capacity, a user capacity, a connection capacity, a transaction rate capacity, and the like. In an aspect, the disclosed methods and systems can interlock a plurality of capacity text results (e.g., using capacity test results to define common regions) from different types of capacity tests (e.g., a steady state test, a spike test, a transient test, and a soak test) to define a region from which the system capacity can be selected. The disclosed methods and systems can decrease the number of iterations and time taken to perform the capacity tests and increase data accuracy for the capacity test results. Furthermore, one or more sets of capacity tests can be calibrated based on test results of the one or more of the capacity tests. One or more testing parameters (e.g., transaction load, ramp up rate) associated with the calibrated one or more capacity tests can then be used to determine the system capacity (e.g., transaction capacity).

In an aspect, the system capacity defined in terms of transaction capacity can be used to determine the system capacity in terms of a user capacity. To determine the user capacity, a plurality of user events can be received for a given time period. A user event can be a user command and/or action on the system. Each user event can be placed in predefined categories of user events. User event distribution data can be determined based on the quantity of active users and the plurality of user events associated with the quantity of active users. In an aspect, each user event can correspond to one or more transactions. For example, a "one time recording" user event on a digital video recording (DVR) system can result in multiple transactions on the system such as "record one shot," "get recordings," and "get recordings list." In an aspect, a user event transaction sequence for each of the quantity of active users can be determined. The user event transaction sequence can indicate a sequence of transactions for each user event category. The user event transaction sequence can also indicate a key transaction, which is a transaction that represents the user event. In an aspect, transaction distribution data can be generated based on the user event distribution data and the user event transaction sequence. The transaction distribution data can be generated by multiplying the number of user events in the user event distribution data by each user event's corresponding transactions, including the key transaction, in the user event transaction sequence. In an aspect, the user capacity of the system (e.g., a maximum number of users associated with the system) can be determined based on the transaction distribution data. Each transaction of the transaction distribution data can be divided by the total number of transactions to determine a percentage weight of each transaction. The percentage weight can be multiplied by a transaction capacity determined by capacity tests to determine how many of the transactions can be performed at a given time. The key transactions of the transactions can be added together which can be an estimate an of the user capacity of the system.

The disclosed methods and systems can provide a holistic approach to interpret capacity test results of a system using any transactional applications. Examples of transactional applications can include a banking application, a website, and any service such as a DVR service, an encoding service, a decoding service, or other types of service.

FIG. 1 illustrates various aspects of an exemplary system in which the present methods and systems can operate.

Those skilled in the art will appreciate that present methods may be used in systems that employ both digital and analog equipment. One skilled in the art will appreciate that provided herein is a functional description and that the respective functions can be performed by software, hardware, or a combination of software and hardware.

The present disclosure is relevant to systems and methods for providing services to a device, for example, a user device such as a computer, tablet, mobile device, communications terminal, or the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to a network, such as the Internet or other remote resources, provide address and/or configuration services like DHCP, and/or provide naming or service discovery services for a premises, or a combination thereof. Those skilled in the art will appreciate that the present methods may be used in various types of networks and systems that employ both digital and analog equipment. One skilled in the art will appreciate that provided herein is a functional description and that the respective functions can be performed by software, hardware, or a combination of software and hardware.

The system can comprise a user device 102 in communication with a computing device 104. By way of example, the user device 102 can comprise a computer, a PDA, a smartphone, a GPS, a vehicle entertainment system, portable media player, a server, a network device, a set top box, or other device capable of communicating with the computing device 104.

In an aspect, the computing device 104 can be a server for communicating with the user device 102. As an example, the computing device 104 can communicate with the user device 102 for providing data and/or services. As an example, the computing device 104 can provide one or more services such as a network printing service, a media management service (e.g., media server), a content service, a DVR service, a streaming service, an encoding service, a decoding service, an encryption service, a decryption service, and the like. In an aspect, the computing device 104 can allow the user device 102 to interact with remote resources such as data, devices, and files. As an example, the computing device 104 can be configured as (or disposed at) a central location (e.g., headend, or processing facility), which can receive content (e.g., data, input programming) from multiple sources. The computing device 104 can combine the content from the multiple sources and can distribute the content to user (e.g., subscriber) locations via a distribution system.

The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

In an aspect, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104. For example, the user device 102 can transmit a service request (e.g., a DVR search request, one time recording request) to the computing device 104 via the communication element 106.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108. As another example, the device identifier 108 can be transmitted when a service request (e.g., a DVR service request, one time recording request) is submitted from the user device 102 to the computing device 104.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network. As an example, the address element 110 can be transmitted when a service request (e.g. one time recording request) is submitted from the user device 102 to the computing device 104.

In an aspect, the service element 112 can comprise an identification of a service provider associated with the user device 102 and/or with the class of user device 102. The class of the user device 102 can be related to a type of device, a capability of the device, a type of service being provided (e.g., an encoding service, a decoding service, a transcoding service, a DVR service), and/or a level of service (e.g., business class, service tier, service package, and the like). As an example, the service element 112 can comprise information relating to or provided by a service provider (e.g., DVR service provider) that is providing or enabling data flow such as DVR services to the user device 102. As a further example, the service element 112 can comprise information relating to a preferred service provider for one or more particular services relating to the user device 102. In an aspect, the address element 110 can be used to identify or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can manage the communication between the user device 102 and a database 114 for sending and receiving data there between. As an example, the database 114 can store a plurality of files (e.g., user event history information), user identifiers or records, or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. As an example, the database 114 can comprise a user event history 116. In an aspect, a user event can be associated with a user operation. The user event history 116 can comprise user operation history information, such as time to submit a service request, time to process a service request, and type of the service request associated with a plurality of users (e.g., user device 102). In an aspect, the user event history 116 can comprise statistical data on user event history information. For example, statistical data can comprise total number of active users at a given time period. As another example, statistical data can comprise user event distribution at a given time period. A category can be a class of user events. Using an example of a website, when a user performs a user event such as selecting a link to navigate to another webpage, a category for the user event can be "link selection." Each user event where a link is selected, regardless of which link is selected, can fall under the category of "link selection." In an aspect, the user event history 116 can be used to determine a capacity (e.g. transaction capacity, user capacity) of a system (e.g., computing device 104). The database 114 can be disposed remotely from the computing device 104 and accessed via direct or indirect connection. The database 114 can be integrated with the computing device 104 or some other device or system.

In an aspect, the computing device 104 can comprise a capacity determination element 118. The capacity determination element 118 can be configured to determine a system capacity, such as a transaction capacity of a system, a user capacity of a system, and/or the like. The transaction capacity can be a threshold number of transaction being performed on the system at which the performance of the system still complies with performance expectations of a system requirement such as defined by a service level agreement (SLA). The user capacity can indicate a maximum number of users that can be active at any given time on the system and the performance of the system still complies with the system requirement.

In an aspect, the capacity determination element 118 can be configured to determine a first set of capacity test results, a second set of capacity test results, and a third set of capacity test results by performing a first set of capacity tests (e.g., a steady state test), a second set of capacity tests (e.g., a spike test), and a third set of capacity tests (e.g., a transient test), respectively, on a system. The first set of capacity tests can indicate a maximum number of transactions (e.g., a capacity ceiling) on the system. The second set of capacity tests can indicate a maximum number of transactions on the system in the least amount of time (e.g., a capacity floor). The third set of capacity tests can indicate a ramp up rate of transactions that can achieve the capacity ceiling in the least amount of time. The first set of capacity tests, the second set of capacity tests, and the third set of capacity tests are explained in further detail below.

The capacity determination element 118 can be configured to calibrate capacity tests based on one or more capacity test results. For example, the capacity determination element 118 can be configured to calibrate one or more of the first set of capacity tests, the second set of capacity tests, the third set of capacity tests, and/or the like. In an aspect, calibration can be performed based on the first set of capacity test results, the second set of capacity test results, the third set of capacity test results, and/or the like. Calibration can be performed by comparing the first set of capacity test results, the second set of capacity test results, and the third set of capacity test results to each other to determine whether or not there are any inconsistencies. Then the capacity determination element 118 can adjust one or more of the capacity tests and/or system and perform the inconsistent capacity tests again until the first set of capacity test results, second set of capacity test results, and third set of capacity test results are consistent with what is expected. For example, if the second set of capacity tests (e.g., spike test) determines a value higher than the capacity ceiling determined by the first set of capacity tests, then the capacity determination element 118 can determine that the first set of capacity tests, second set of capacity tests, and/or both need to be adjusted because of the inconsistency of results. The first set of capacity tests and the second set of capacity tests can be performed again and adjusted as necessary until the results are consistent with what is expected. A fourth set of capacity tests can be performed using one or more testing parameters (e.g., load volume, ramp up rate) associated with the one or more of first set of capacity tests, the second set of capacity tests, and/or the third set of capacity tests that are calibrated.

In yet another aspect, the capacity determination element 118 can be configured to determine a system capacity (e.g., transaction capacity and/or user capacity) based on the first set of capacity test results, the second set of capacity test results, the third set of capacity test results, a fourth set of capacity test results derived from the fourth set of capacity tests, and/or the like.

In an aspect, a first set of capacity tests (e.g., steady state test) can be implemented by applying a ramp up rate of transactions. For example, applying a ramp up rate can comprise continuously adding additional load to the system. A load can be based on transactions, users, events, connections, and the like. For example, the ramp up rate can be X transactions per Y seconds, where X and Y can be any positive number appropriate for testing purposes. As an example, X can comprise 1, 2, 3, 5, 10, 25, 100, and/or the like. Y can comprise 1, 5, 10, 12, 20, 15, and/or the like. The ramp up rate can reach a load of Z which can be any positive number appropriate for testing purposes. As an example, Z can be 10, 100, 1000, 10000 transactions and/or the like. By way of illustration, the ramp up rate can be 1 transaction per 12 seconds. Throughout the disclosure, the load will be described as a transaction load, though it should be appreciated that the disclosure contemplates the use of other loads. The first set of capacity tests can continue to apply additional load to the system until the system is noncompliant with a predefined system requirement (e.g., SLA). The system requirement can comprise predefined performance parameters of the system such as latency, processor/memory utilization, capacity, transaction rates, errors, error rates, availability, and/or the like. The transaction load being performed before noncompliance with the system requirement can be indicative of a maximum transaction load on the system also referred to herein as a capacity ceiling. The first set of test results indicates the capacity ceiling because the slow ramp up rate in the steady state test nearly eliminates the ramp up rate as a factor in affecting the capacity ceiling (e.g., maximum transaction load on the system).

A second set of capacity tests (e.g., a spike test) can be performed by applying a plurality of predefined transaction loads such as a first transaction load, a second transaction load, and so on. The second set of capacity tests can be performed to determine a capacity floor which is a maximum number of transactions in the least amount of time where the performance of the system can comply with the system requirement. The capacity determination element 118 can perform the second set of capacity tests on the system. The capacity determination element 118 can apply a first ramp up rate of transactions to the system, which can be the fastest ramp up rate that the system can perform. The first ramp up rate can be applied to the system until the first transaction load is met. If the first transaction load is compliant with the system requirement, then the second transaction load can be greater than the first transaction load. If the first transaction load is noncompliant with the system requirement, then the second transaction load can be less than the first transaction load. The capacity determination element 118 can continue to perform the second set of capacity tests until a lesser transaction load is compliant with the system requirement and the next greater transaction load is noncompliant with the system requirement, which indicates that the lesser transaction load is the maximum number of transactions the system can perform in the shortest amount of time (e.g., capacity ceiling).

For example, the capacity determination element 118 can perform the second set of capacity tests (spike test) by applying a plurality of transaction loads (e.g., 1000, 900, 800, 700, 600, or any suitable number of transactions) to the system to determine a capacity floor of the system. For example, a predefined load of 1000 transactions can be added to the system quickly (e.g., nearly instantaneously) to determine a maximum transaction load on the system in the shortest time. As an illustration, if adding 1000 transactions results in the system being noncompliant with the system requirement, then a smaller number of transactions can be added to the system (such as 900 transactions) to determine whether the performance of the system complies with the system requirement. If the spike test of 900 transactions complies with the system requirement, then 900 transactions can be the capacity floor (e.g., the maximum transaction load on the system in the shortest amount of time). Since transactions cannot be added to the system any faster than during the spike test, the spike test results indicate that any ramp up rate that is equal or slower will be in compliance with the system requirement for at least 900 transactions. The spike test results also indicate that any transaction load less than 900 transactions, regardless of the ramp up rate, should still comply with the system requirement.

A third set of capacity tests (e.g., a transient test) can use one or more predefined transaction loads with a plurality of ramp up rates. The third set of capacity tests can vary the ramp up rate of transactions to the predefined transaction loads to determine a maximum ramp up rate for the system. The maximum ramp up rate can be a ramp up rate that is in compliance with a system requirement for the transaction loads between the capacity ceiling and capacity floor. The capacity determination element 118 can apply the first ramp up rate to the system until the first transaction load is achieved. If the first ramp up rate complies with the system requirement, then a second ramp up rate can be applied to the system until first transaction load is achieved. The second ramp up rate can be a faster ramp up rate than the first ramp up rate. The capacity determination element 118 can determine whether the second ramp up rate is in compliance with the system requirement. If the second ramp up rate is in compliance with the system requirement, then a third ramp up rate that is faster than the second ramp up rate can be applied to the system until the first transaction load is met and so on until a ramp up rate is noncompliant with the system requirement. If the second ramp up rate is noncompliant with the system requirement, then the first ramp up rate is the maximum ramp up rate for the first transaction load. The third set of capacity tests can then perform one or more ramp up rates on a second transaction capacity and so on until the maximum ramp up rate for each transaction load is the same for at least two consecutive transaction loads. In an aspect, the maximum ramp up rate of the first transaction load can be a first ramp up rate applied to the system until the second transaction load is achieved. If the first ramp up rate fails, a second slower ramp up rate can be applied to the system until the second transaction load is achieved.

As an example, the third set of capacity tests (transient test) can load 1000 transactions with a ramp up rate of 1 transaction per 6 seconds, 1 transaction per 3 seconds, and the like. The transient test is used to determine a maximum ramp up rate that should work for all transaction loads between the capacity ceiling and capacity floor. For example, the transient test can determine that the maximum ramp up rate for 1000 transactions is 1 transaction per 1 seconds but the maximum ramp up rate for 1100 transactions is 1 transaction per 2 seconds and still complies with the system requirement. The transient test can also show that the maximum ramp up rate for 1200 transactions is 1 transaction per 2 seconds. Since the ramp up rate between 1100 transactions and 1200 transactions does not change, 1 transaction per 2 seconds is likely to be in compliance with the system requirement for transaction loads of 1100 transactions and greater. The transient test results can be that the maximum ramp up rate is 1 transaction per second. The result of the transient test can be used in conjunction with the capacity ceiling of the first set of capacity tests (e.g., steady state test), capacity floor of the second set of capacity tests (e.g., spike test), and the ramp up rate of the first set of capacity tests to determine a first region of system capacity.

In an aspect, the first set of capacity tests, the second set of capacity tests, the third set of capacity tests, and the fourth set of capacity tests can be performed in any order. In an aspect, the methods can be performed with fewer capacity tests than are described herein. In an aspect, other capacity tests can be contemplated other than those described as examples for each of the first set of capacity tests, the second set of capacity tests, the third set of capacity tests, and the fourth set of capacity tests (e.g., the steady state tests, the spike tests, transient tests, and soak tests, respectively).

Furthermore, one or more of the first set of capacity tests, the second set of capacity tests, and the third set of capacity tests can be calibrated based on the first set of capacity test results, the second set of capacity test results and the third set of capacity test results. If a result of one of the capacity test results contradicts other capacity test results, then the capacity determination element 118 can make adjustments (e.g., change ramp up rate) to the system and/or capacity tests then retest. For example, if the spike test is successfully completed for a transaction load greater than the capacity ceiling, then either the spike test was performed incorrectly or the capacity ceiling is incorrect, which means that the steady state test may need to be adjusted.

As an example, when running a first set of capacity tests (e.g., steady state tests), a procedure of a steady state test can be followed. For example, a number of transactions and a ramp up rate associated with the steady state test can be set to 10 transactions per minute for 10 minutes and wait for 5 minutes then the steady state test can continue the same ramp up rate for 10 minutes and wait for 5 minutes. The steps of the procedure can be continued until the performance of the system is noncompliant with a system requirement. A transaction load before noncompliance with the system requirement can be determined as a capacity ceiling and a candidate for system capacity (e.g., maximum transaction capacity).

As another example, when running a third set of capacity tests (e.g., transient tests), the procedure of the steady state test can be followed but with a faster ramp up rate. In certain scenarios where the system is in noncompliance with the system requirement, when the ramp up rate in the transient test (8 transactions per minute) is slower than the steady state (10 transactions per minute). Such scenarios can indicate the transient test was conducted incorrectly and/or the steady state test was performed incorrectly. Therefore, system configuration and/or test parameters (e.g., ramp up rate, maximum transaction load, waiting time) of the first set of capacity tests and the third set of capacity tests can be calibrated by determination element 118 to make transient test results coincide with steady state results.

As another example of capacity test calibration, a third set of capacity tests (transient test) and a second set of capacity tests (spike test) can use the same number of transaction loads (e.g., 1000, 900, 800, 700 transactions). Where both the spike test and the transient test are using the same number of transactions, if the spike test can ramp up all 1000 transactions in 20 minutes at 50 transactions/minute and the transient test can ramp up at 40 transactions/minute, the inconsistency can be an indication that the spike test and/or the transient test are performed incorrectly and/or an error occurred, because the spike test should have less bandwidth (e.g., total transactions) than the transient test due to the burst of transactions. The fastest ramp up rate a spike test should have is the transient ramp up rate or less since the transient ramp up rate is the maximum ramp up rate for the given number of transactions, lithe spike test results and the transient test results are not consistent, configuration of the capacity determination element 118 and/or a system configuration (e.g., ramp up rate) can be calibrated.

In an aspect, a fourth set of capacity tests (e.g., a soak test) can be performed. A soak test can be used to further define and/or verify a system capacity range determined by the first region defined by the first set of capacity test results, the second set of capacity test results, and the third set of capacity test results. An example of the first region and how the first set of capacity test results, the second set of capacity test results, and the third set of capacity test results defines the first region is illustrated and described in FIG. 4 below. The soak test can use the capacity ceiling determined by the first set of capacity test results and the maximum ramp up rate determined by the third set of capacity test results as test parameters. Once the capacity ceiling is reached by applying the maximum ramp up rate, the transaction load can be set to constant (no more additional load) to determine system capacity in terms of transactions per second (TPS). The constant transaction load can be applied to the system for an extend period of time (e.g., 12 hours). The fourth set of capacity tests can further define and/or verify the first region of the system capacity defined by the first set of capacity tests, the second set of capacity tests, and the third set of capacity tests. If not verified (the fourth set of capacity tests were in noncompliance with the system requirement), the fourth set of capacity tests can be adjusted and further define a second region of the first region. The capacity determination element 118 can use the second region to determine, select, calculate, and/or the like system capacity (e.g. calibrated maximum transaction rate) from the second region in transactions per second or maximum transaction load.

As an example, the soak test can be performed by using a predefined ratio (e.g., 85%) of the capacity ceiling determined by the first set of capacity tests. If the soak test failed with a predefined ratio (e.g., 85%) of the capacity ceiling determined by the first set of capacity tests, the predefined ratio (e.g., 85%) can be calibrated to a smaller ratio (e.g., 80%, 75%, etc.). A system capacity (e.g. a maximum transaction load or ramp up rate) of the system can be determined based on the first set of capacity test results, the second set of capacity test results, the third set of capacity test results, and a fourth set of capacity test results of the fourth set of capacity tests. In an aspect, other combinations of capacity test results can be used to calibrate the first set of capacity tests, second set of capacity tests, third set of capacity tests, and fourth set of capacity tests.

In an aspect, the capacity determination element 118 can be configured to determine a quantity of active users of a system (e.g., computing device 104) and a plurality of user events (e.g., user operations) associated with the quantity of active users. The capacity determination element 118 can be configured to determine user event distribution data based on the quantity of active users and the plurality of user events associated with the quantity of active users. User event distribution data can be categorized such that the user event distribution data is grouped by a type of user event. For example, a quantity of active users on a specific website can perform a plurality of user events, such as performing a search, browsing, clicking next page, registering, logging in, and the like, which each can be categories of user events. In another aspect, categorized user event distribution data or the user event distribution data can be represented in a matrix format. In an aspect, the user event distribution data can comprise a plurality of user events, respective counts of the plurality of user events, and a percentage weight of the respective plurality of user events based on the respective counts. In an aspect, the user event distribution data P (U-DNA) can be determined based on a percentage weight of user events for the quantity of active users. As such, a percentage weight for each type of user event can be determined. In an aspect, a user event distribution percentage can be determined by categorizing user events and calculating percentage weight of each type of user event over total user events performed by the quantity of active users. A mathematical formula to calculate the user event distribution percentage can be written as: $P(E^m) = E^{(x)}/\text{Sum}(E^0 \sim E^m)$, where P represents percentage, and $E^x$ represents user events $E^1, E^2 \ldots E^m$, and m represents the total number of user events performed by the plurality of users.

In an aspect, the capacity determination element 118 can be configured to determine a user event transaction sequence for each of the quantity of active users. In an aspect, the user event transaction sequence can indicate a sequence of transactions for each of the plurality of user events performed one at a time. An example of the user event transaction sequence is illustrated below in Table 3.

In an aspect, transaction distribution data can be generated based on the user event distribution data and the user event transaction sequence. In an aspect, the transaction distribution data can be categorized in the same manner as the user event distribution data. In an aspect, the transaction distribution data can be formatted as a matrix. The capacity determination element 118 can be configured to determine a maximum number of active users associated with a system based on the transaction distribution data of the system. In an aspect, determining a maximum number of users associated with the system based on the transaction distribution data can comprise multiplying a performance parameter of the system (e.g., transaction capacity determined by the capacity determination element 118) and the transaction distribution data P (U-DNA). The performance parameter of the system can comprise transactions per second (TPS) of the system. In an aspect, the capacity determination element 118 can access the user event history 116 for any user event data to determine user capacity of a system.

Figure 2:
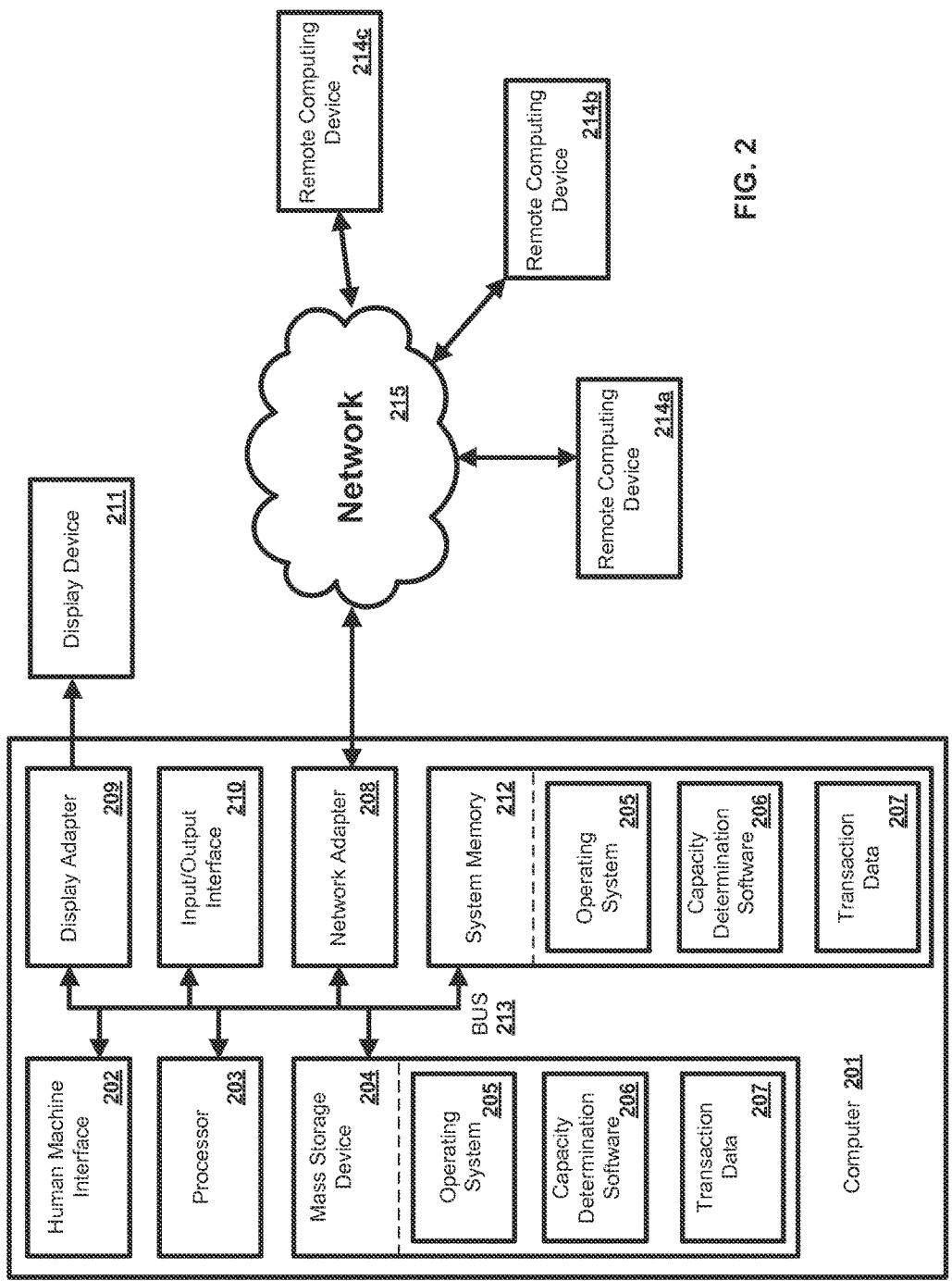
FIG. 2 is a block diagram illustrating an example computing device.

In an aspect, the methods and systems can be implemented on a computer 201 as illustrated in FIG. 2 and described below. By way of example, the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, hut are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and the like that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors 203, a system memory 212, and a system bus 213 that couples various system components including the processor 203 to the system memory 212. In the case of one or more processors 203, the system can utilize parallel computing.

The system bus 213 represents one or more of several possible types of bus structures, including a memory bus or memory controller, a peripheral bus, an accelerated graphics port, and a processor 203 or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 213, and all buses specified in this description can also be implemented over a wired or wireless network connection and each of the subsystems, including the processor 203, a mass storage device 204, an operating system 205, capacity determination software 206, transaction data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as transaction data 207 and/or program modules such as operating system 205 and capacity determination software 206 that are immediately accessible to and/or are presently operated on by the processor 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and capacity determination software 206. Each of the operating system 205 and capacity determination software 206 (or some combination thereof) can comprise elements of the programming and the capacity determination software 206. Transaction data 207 can also be stored on the mass storage device 204. Transaction data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processor 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display device 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computer 201, and are executed by the data processor(s) of the computer. An implementation of capacity determination software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 3:
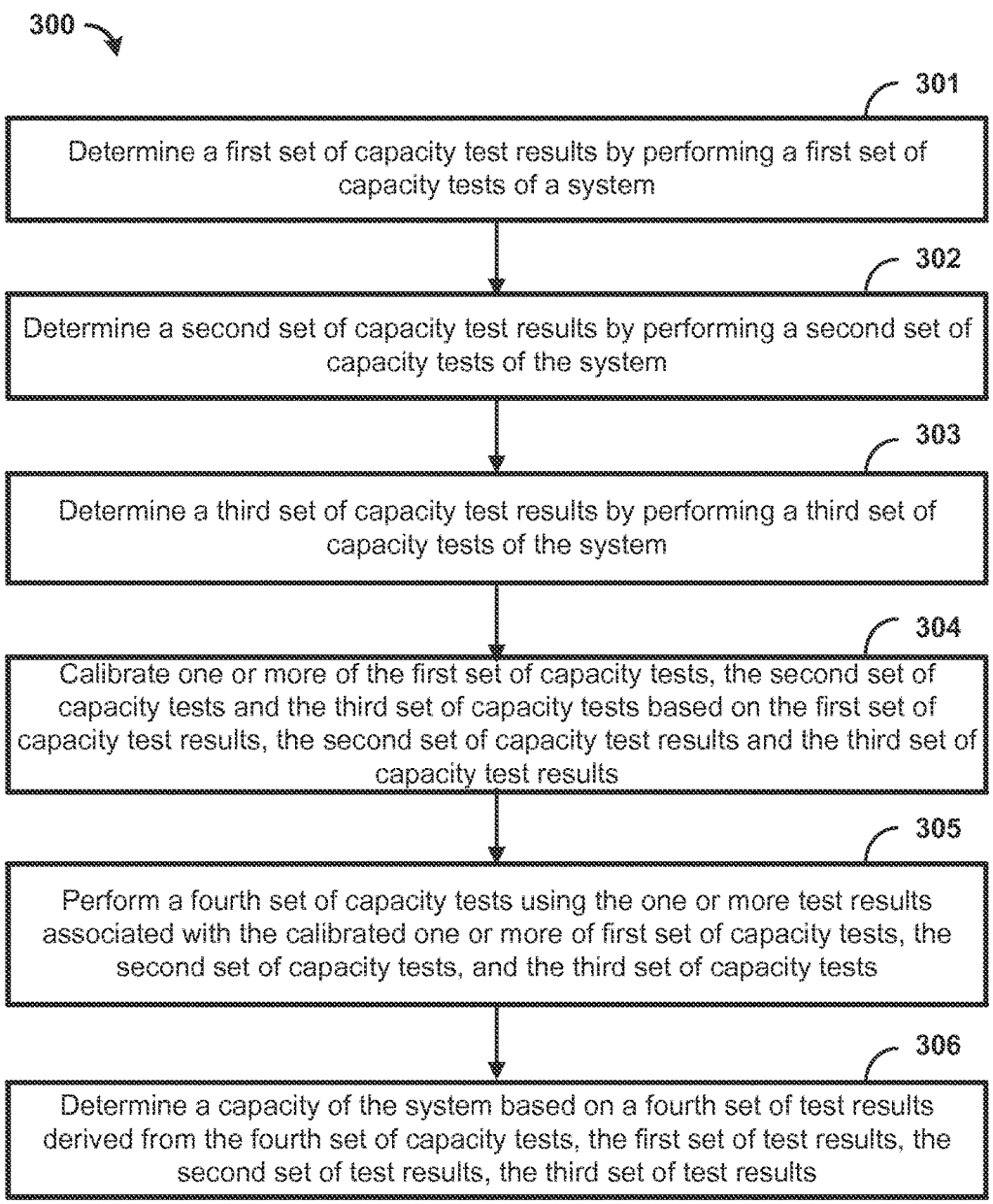
FIG. 3 is a flowchart illustrating an example method.

FIG. 3 is a flowchart illustrating an example method 300 to determine a system capacity. At step 301, a first set of capacity test results can be determined by performing a first set of capacity tests on a system. As an example, the system can be a system that provides a service such as a DVR service, an encoding service, a decoding service, a web service, and/or other types of services. As another example, the system can comprise any transactional application, such as a banking transactional application, other online transactional applications, any system performance application for a benchmarking test, and the like. As an example, the first set of capacity tests can comprise a steady state test. The first set of capacity tests can determine a capacity ceiling such as a maximum transaction load that is in compliance with particular network criteria or business driven criteria or, such as a system requirement of a service level agreement (SLA), that can be predefined. In an aspect, the system requirement can be based on a specific system, a service and/or an application.

In an aspect, a goal of the first set of capacity tests (e.g., steady state test) can be to identify the capacity ceiling for the system based on the system requirement. In an aspect, a steady state test can be implemented by applying a load transaction load) to an application, a service, and/or a system with a ramp up rate such that the ramp up rate does not affect performance.

In an aspect, the first set of capacity test results can comprise a predefined number of capacity tests, for example, one capacity test, two capacity tests, or any appropriate number of capacity tests. The first set of capacity test results can be derived according to one or more predefined testing parameters (e.g., transaction load, ramp up rate of transactions) applied to the first set of capacity tests. For example, the first set of capacity tests can be a steady state test. The steady state test can be performed according to a transaction load with a moderate ramp up rate (e.g., 1 transaction every 6 seconds, 1 transaction every 12 seconds, etc.). In an aspect, soaking (e.g., applying a constant transaction load) can be performed for a predefined time period (e.g., soaking at 1000 transactions for 10 minutes) after ramp up to observe resource utilization of a service/system under test (SUT) (e.g., CPU, memory, input, output, latency, and other key performance indicators). As an example, a system requirement of an SLA can require that resource utilizations be maintained within a predefined amplitude when the resource utilizations are monitored by the SUT. If a resource utilization amplitude is spiky, then this condition can result in the SUT not being in compliance with the SLA. Thus, the ramp up rate and the soak time can be adjusted until the SUT is in compliance with the SLA. When the resource utilization amplitude is not spikey during ramp up, then this condition can indicate that the ramp up rate is minimally affecting resource utilization of the SUT. Therefore, the transaction load can be singled out as the testing parameter that primarily affects the resource utilization and can be adjusted to determine the capacity ceiling.

In an aspect, the first set of capacity tests (e.g., steady state test) can be configured with one or more ramp up rates that are constant (e.g., 1 transaction per 6 seconds, 1 transaction per 12 seconds). In an aspect, a first capacity test of the first set of capacity tests can ramp up at a first ramp up rate and soaked at various constant load volumes (e.g., transaction loads) repeatedly until noncompliance with the system requirement to determine the SUT's maximum load volume (e.g., capacity ceiling). For example, if 2000 transactions can be successfully performed before noncompliance with the SLA of a SUT, then 2000 transactions can be the SUT's maximum transaction load capacity (e.g., capacity ceiling). In an aspect, a second capacity test of the first set of capacity tests can ramp up at a second ramp up rate and soaked at various constant load volumes transaction loads) until the SUT is in noncompliance with the system requirement to verify the maximum load volume of the first capacity test and to further define an optimal ramp up rate.

At step 302, a second set of capacity test results can be determined by performing a second set of capacity tests of the system. The second set of capacity tests can comprise a spike test. The second set of capacity tests can determine a maximum number of transactions that the system can process in the least amount of time for the performance of the system to still be compliant with the system requirement. In an aspect, a second set of capacity tests can be performed by applying a plurality of predefined transaction loads (e.g., 1000, 900, 800, 700, 600 users) with a very high ramp up rate (e.g., nearly instantaneously) such as the highest ramp up rate possible for the system. The highest predefined transaction load to comply with the system requirement during the spike test can indicate a capacity floor. The system capacity can be defined by a region somewhere between the capacity floor, capacity ceiling, and further defined by the ramp up rate of the first set of capacity tests. The second set of capacity test results can further verify the boundary of the capacity ceiling determined at step 301 as explained further in step 304.

In another aspect, the second set of capacity test results can be derived according to one or more predefined testing parameters. For example, a spike test can apply a plurality of predefined transaction loads 1000, 900, 800, 700, 600 transactions) with a plurality of ramp up rates (e.g., 60, 50, 40, 30 transactions/minute). In an aspect, the plurality of predefined transaction loads to maintain current active transactions can be applied throughout capacity testing. No additional transactions can be added. In an aspect, the second set of capacity test results can comprise a respective predefined number of capacity tests (e.g., 3 tests, 5 tests).

An example spike test result can comprise:
1: 1000 transactions completed instantaneously with error
2: 900 transactions completed instantaneously without error
3: 800 transactions completed instantaneously without error In an aspect, one or more ramp up rates from the successful spike test result can be calculated, if the spike tests have some ramp up time to reach the desired number of transactions. An example ramp up rate can comprise:
2: 56 transactions/minute
3: 57 transactions/minute One or more ramp up rates can be used for a third set of capacity tests' (e.g., transient test) validation.

At step 303, a third set of capacity test results can be determined by performing a third set of capacity tests on the system. The third set of capacity test results can be in terms of transactions per second (TPS). As an example, the third set of capacity tests can be transient tests. The third set of capacity tests (e.g., transient tests) can comprise a plurality of tests (e.g. 2 tests, 3 tests, 4 tests, 5 tests, etc. . . . ). In an aspect, the goal of the transient test can be to identify a maximum ramp up rate for the system requirement. The transient test can be implemented by applying defined constant transaction loads with a plurality of ramp up rates. In an aspect, the defined constant transaction loads can be the same transaction loads used for the spike tests of the second set of capacity tests (e.g., 1000, 900, 800, 700, 600 transactions). For example, the predefined constant transaction load can be 1000 transactions. As an illustration, the plurality of ramp up rates can be:

1: 1 transaction/1 second: 1000 transactions completed with error or not in compliance with the system requirement in 17 minutes (58 transactions/minute)

2: 1 transaction/2 seconds: 1000 transactions completed without error or in compliance with the system requirement in 34 minutes (29 transactions/minute)

3: 2 transactions/3 seconds: 1000 transactions completed without error or in compliance with the system requirement in 25 minutes (40 transactions/minute).

Test #3 can be the maximum ramp up rate because test #3 has the fastest ramp up rate that is still in compliance with the system requirement. The ramp up rate of test #3 can then be verified by increasing the transaction load (e.g. 1100) but using the same ramp up rate (40 transactions/minute). If the ramp up rate of 40 transactions/minute for 1100 transactions does not cause an error and/or is in compliance with the system requirement, then the ramp up rate of 40 transactions/minute is likely be in compliance with the system requirement for any number of transactions greater than 1100 transactions. Therefore, applying the maximum ramp up rate to the capacity ceiling determined by the first set of capacity tests can further define the system capacity. The system capacity can be defined by the capacity floor, capacity ceiling, the ramp up rate of the first set of capacity tests, and the maximum ramp up rate of the third set of capacity tests applied to the capacity ceiling.

At step 304, one or more of the first set of capacity tests, the second set of capacity tests, and the third set of capacity tests can be calibrated based on the first set of capacity test results, the second set of capacity test results, and the third set of capacity test results. The one or more of the first set of capacity tests, the second set of capacity tests, and the third set of capacity tests can be calibrated after verifying respective sets of capacity test results are not consistent with each other.

In an aspect, the second set of capacity tests can be used to verify the first set of capacity test results. For example, if a spike test is performed successfully at or greater than the capacity ceiling of the first set of capacity tests, then this result can indicate that the first set of capacity tests were performed incorrectly or the capacity ceiling determined by the first set of capacity tests is not a true capacity ceiling. The system and capacity determination element 118 of FIG. 1 can adjust the system, the first set of capacity tests, and/or the second set of capacity tests. One or more of the first set of capacity tests and/or second capacity tests can be performed again until each set of capacity tests are verified to be consistent.

In an aspect, the third set of capacity test results can be used to verify the second set of capacity test results and vice versa. If the ramp up rate of the second set of capacity test results used to verify the capacity floor is ever greater than the third set of capacity test results, then this condition can indicate that the second set of capacity test results and/or the third set of capacity test results are not correct, because the third set of capacity tests determines the maximum ramp up rate. If a ramp up rate is greater in another capacity test, then this condition indicates there was an error and configuration/calibration by the capacity determination element 118 of the system and/or test parameters (e.g., ramp up rate) of the third set of capacity tests and second set of capacity tests can be performed.

At step 305, a fourth set of capacity tests can be performed using one or more test parameters associated with one or more of the first set of capacity tests, the second set of capacity tests, and the third set of capacity tests. A fourth set of capacity test results can be derived from the fourth set of capacity tests.

In an aspect, a soak test can be performed by applying constant transaction load determined by the first set of capacity test results (e.g., capacity ceiling) for a predefined time period (e.g., 10 minutes, 1 hour, 3 hours, 12 hours, and/or the like) without increasing the transaction load. In an aspect, before the fourth set of capacity tests are performed, the transaction load and ramp up rates to determine the system capacity can be within a large range of possibilities. The fourth set of capacity tests can further define a system capacity range determined by the first set of capacity tests, the second set of capacity tests, and the third set of capacity tests, thereby narrowing down the large range. The fourth set of capacity tests can further be used to verify the large range determined by the first set of capacity tests, the second set of capacity tests, and the third set of capacity tests.

In an aspect, a goal of the soak test can be to obtain an optimal system capacity for a system requirement. The system capacity can be based on the system requirement and the region of possible soak capacities defined by the soak test. The fourth set of capacity test results can be derived based on one or more test parameters (e.g., transaction load, ramp up rate) associated with one or more of the first set of capacity tests, the second set of capacity tests, and the third set of capacity tests that are calibrated. The soak test can be implemented by applying a first soak test at a transaction load that is greater than that of the capacity ceiling. The capacity ceiling can be a result of the first set of capacity tests. The soak test can further be implemented by applying a second soak test that is less than that of the capacity ceiling. For example the first soak test and second soak test can be performed at 115% and 85%, respectively, of the capacity ceiling. The fourth set of capacity tests (e.g., soak test) can be performed by applying a transaction load of 85% of the capacity ceiling (e.g., 85% of 2000=1700 transactions).

The maximum ramp up rate determined by the third set of capacity tests can be used to reach the transaction load of a soak stage. Once a SUT reaches the transaction load (e.g., 1700 transactions), the SUT can be maintained (e.g., soaked) at the transaction load (e.g., 1700 transactions) for an extended amount of time such as 1 hour, 2 hours, 12 hours, or however long is necessary to generate accurate results. Expected results of the fourth set of capacity tests, during ramp up, can be performance of the SUT to be compliant with the system requirement. Expected results of the fourth set of capacity tests during the soak stage with a transaction load at 85% of the capacity ceiling can be the performance of the SUT to be compliant with the system requirement. If any of the expected results are not satisfied, one or more test parameters such as ramp up rate and/or percentage of the total capacity (e.g., 80% instead of 85%) can be adjusted in the fourth set of capacity tests until the expected results are satisfied.

In another aspect, the soak test can be performed at the capacity ceiling (e.g. 100%) to verify the SUT can be in compliance with the system requirement at the capacity ceiling. In another aspect, the soak test can be performed at 115% of the capacity ceiling to verify that the capacity ceiling is a true capacity ceiling and that the first set of capacity test results are correct. If at 115% the SUT is in compliance with the system requirement during the fourth set of capacity tests, then this result can indicate the first set of capacity tests were not performed correctly or vice versa, then calibration by the capacity determination element 118 of the system and/or test parameter (e.g., ramp up rate) can be performed.

At step 306, a system capacity can be determined based on the first set of capacity test results, the second set of capacity test results, the third set of capacity test results, and the fourth set of capacity test results. As an example, determining the system capacity can comprise determining one or more of a maximum capacity, a maximum transaction load, a maximum transaction ramp up rate, a maximum system resource utilization (e.g., CPU, system memory), a maximum number of active users, and an optimal region for the system requirement. See FIG. 4 for an example of system capacity determination.

Figure 4:
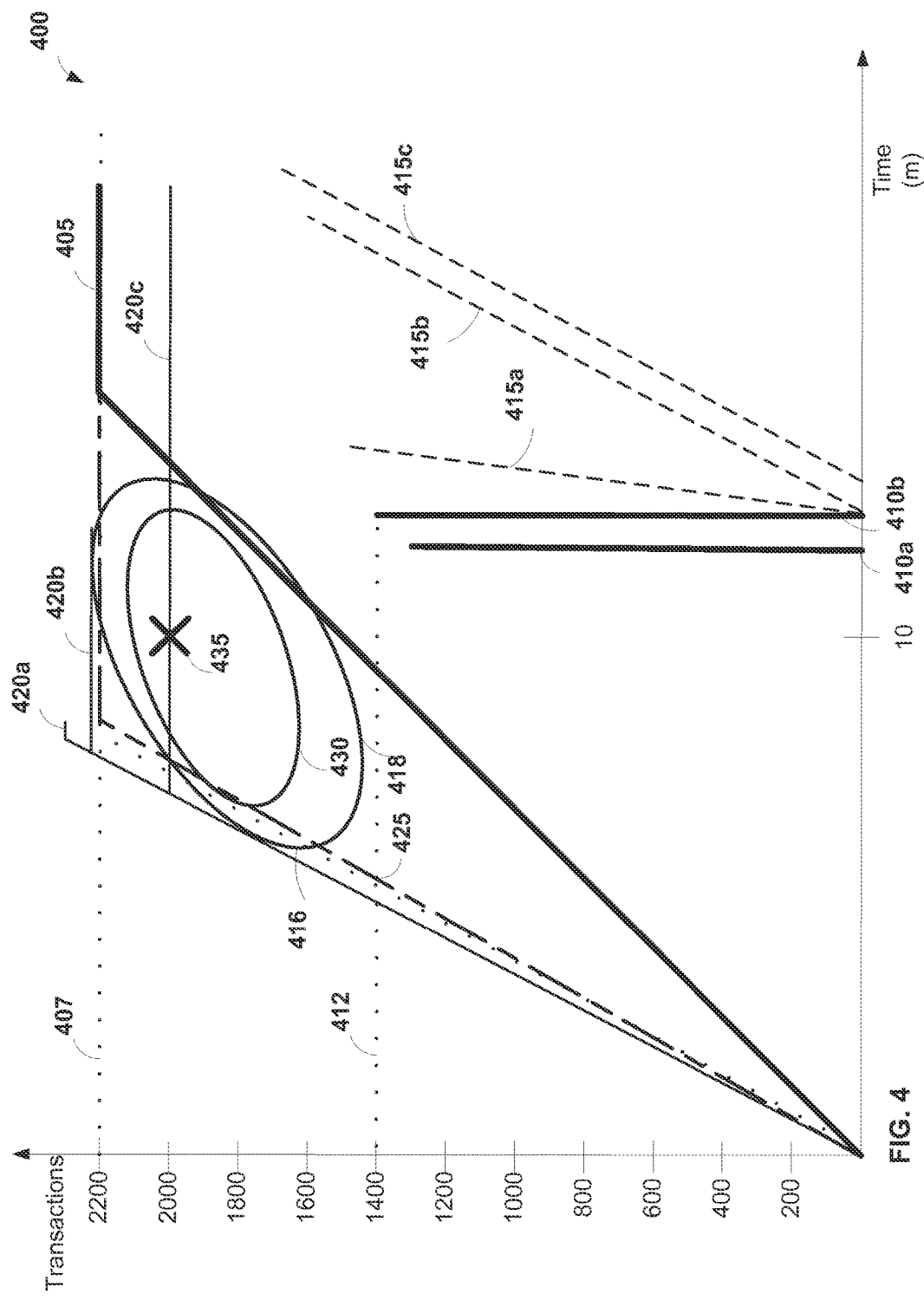
FIG. 4 is a graph illustrating capacity test results and capacity determination.

FIG. 4 is a graph 400 illustrating capacity test results of a system and determination of a system capacity such as transaction capacity, or ramp up rate (e.g., transactions per second) based on the capacity test results of the system. The graph 400 illustrates the number of transactions being performed (y-axis) with respect to time (x-axis). In an aspect, a first set of capacity tests can be performed. The first set of capacity tests can be a steady state test. Steady state test results, represented by steady state plot 405, can create a general region for system capacity. The steady state test can gradually ramp up until system performance does not comply with a system requirement.

As an example, the results of steady state plot 405 show the steady state test ramping up at a steady ramp up rate but once the steady state plot 405 reaches 2200 transactions, performance of the system is not in compliance with a network parameter, a business parameter such as a system requirement of an SLA. The capacity determination element 118 can determine that 2200 is a maximum capacity of transactions (e.g., capacity ceiling 407) for the system based on when the noncompliance occurred and what transaction load was on the system before the noncompliance of the system requirement. The ramp up rate used for the steady state test to reach the capacity ceiling 407 is not as significant with the steady state test because a slow ramp up rate up nearly eliminates the ramp up rate as a factor that can affect the system to be in noncompliance of the system requirement. As a result of the steady state plot 405, the capacity determination element 118 can determine that an region (e.g., area) defined below 2200 transactions and to the right of the steady state plot 405 is a functional system capacity (e.g., all ramp up rates and transaction loads within the boundary can be performed without being noncompliant with an system requirement). The region to the left of the steady state plot 405 and 2200 transactions or less can be a system capacity candidate. Any transaction load regardless of ramp up rate above 2200 transactions should be noncompliant with the system requirement.

Possibilities of the system capacity can be further defined by a second set of capacity tests. The second set of capacity tests can be a set of spike tests. Spike tests can put immediate transaction loads on the system to determine the maximum number of transactions to be completed in compliance with an system requirement in the shortest time. In the example of graph 400, the capacity determination element 118 could initiate several different transaction loads of a spike test to determine whether any of the transaction loads meet the system requirement. For example, the performance capacity engine can initiate transaction loads of 1700, 1600, 1500, 1400, and 1300 transactions. The graph 400 indicates that, for the system, only spike tests of 1300 transactions and 1400 transactions (denoted by spike plot 410a and spike plot 410b respectively) can meet the system requirement. Spike tests of 1700, 1600, and 1500 transactions (not illustrated in plot 400) did not comply with the system requirement. The capacity determination element 118 can determine that any transaction load below 1400 transactions should comply with the system requirement no matter what the ramp up rate is since the spike test is ramped up nearly instantaneously and the transaction load of 1400 is in compliance with the system requirement. As a result, the capacity determination element 118 can determine a minimum transaction load of the system capacity represented by a capacity floor 412 that is the transaction load of 1400. Therefore, the system capacity candidate is now defined, bounded, and/or the like by the region (e.g., area) formed by the capacity ceiling 407, and a capacity floor 412 and steady state ramp up rate of steady state plot 405.

Next, the system capacity can be further defined, bounded, and/or the like by a third set of capacity tests. In an aspect, the third set of capacity tests can be transient tests. The transient tests can be used to find a more optimal ramp up rate that is between the nearly instantaneous ramp up rate for the spike tests and the slow ramp up rate of the steady state test. In an aspect, the third set of capacity tests can determine a maximum ramp up rate that can obtain all transaction loads between the capacity ceiling 407 and the capacity floor 412. Defined transaction loads can be used for the transient tests and the ramp up rate can be adjusted, varied, and/or the like to determine the fastest ramp up rate the system can handle to achieve the defined transaction loads and still comply with the system requirement.

In the example of graph 400, the capacity determination element 118 can use the same defined transaction loads as the spike tests (e.g., 1700, 1600, 1500, 1400, and 1300 transactions). Since transaction loads 1400 and 1300 are known to comply with the system requirement for the spike tests, the transaction loads 1400 and 1300 do not need to be tested with the transient test since the ramp up rate of the transient test would be the same as the ramp up rate of the spike test (nearly instantaneous). In other aspects, the transaction loads 1400 and 1300 can be tested with the transient tests to verify and calibrate the spike tests.

The capacity determination element 118 can perform transient tests on the transaction loads of 1500, 1600, and 1700 (transient graphs 415a, 415b, and 415c, respectively). A plurality of ramp up rates (e.g., 1 transaction per second, 2 transactions per 3 seconds, 1 transaction per 2 seconds) can be used to determine the maximum ramp up rate for each transaction load. As illustrated in graph 400 the maximum ramp up rate of transient plot 415a is greater than the ramp up rate of transient plot 415b and transient plot 415c as indicated by the greater slope to transient plot 415a. Also indicated in graph 400, the ramp up rates of transient plot 415b and transient plot 415c are the same, which can indicate that the ramp up rate of 415b is a maximum ramp up rate. The maximum ramp up rate can be defined as any number of transaction loads higher (or less) than 1600 transactions that can use the ramp up rate of transient plot 415b and still comply with the system requirement. Therefore, the capacity determination element 118 can determine the maximum ramp up rate is that of transient plot 415b. The capacity determination element 118 can also determine that the system capacity is now defined, bounded, and/or the like by the region formed by capacity ceiling 407, the capacity floor 412, the steady state ramp up rate of steady state plot 405, and a transient ramp up rate plot 416, which is the maximum ramp up rate to the transaction load of the capacity ceiling 407. In an aspect, depending on the system requirement and whether the ramp up rate is considered higher priority than a maximum transaction load, the transient ramp up rate plot 416 could be at a greater ramp up rate such as transient plot 415*a*. However, the capacity ceiling 407 of the maximum transaction load could decrease. A first region 418 generally represents the area defined, bounded, and/or the like by the capacity ceiling 407, the capacity floor 412 the steady state ramp up rate of steady state plot 405, and a transient ramp up rate plot 416.

In an aspect, a fourth set of capacity tests can be performed by the capacity determination element 118. The fourth set of capacity tests can be used to further define the system capacity or verify the system capacity of the first region 418. The fourth set of capacity tests can be soak tests. Soak tests can use the maximum ramp up rate of the transient test results to ramp up to a constant transaction load and then remain at that constant transaction load for an extended period of time to determine whether the system complies with the system requirement. For example, the constant transaction load can be placed on the system for 12 hours or more. For example, in graph 400 a soak test can be performed represented by soak plot 420*a*. This soak test can be used to confirm that the capacity ceiling is capacity ceiling 407. The soak test represented by soak plot 420*a* is ramped up at the maximum ramp up rate determined by the transient test results and to a transaction load greater than that of capacity ceiling 407. In graph 400, soak plot 420*a* does not comply with the system requirement which indicates that capacity ceiling 407 is likely or close to the maximum transaction load. In another example, a second soak test can be performed at the capacity ceiling 407. As illustrated in graph 400 at soak plot 420*b*, the second soak test at the capacity ceiling 407 also fails. This could indicate that the ramp up rate or the capacity ceiling 407 is not optimal. The capacity determination element 118 can adjust the transaction load for a third soak test as in soak plot 420*c* and/or the capacity determination element 118 could adjust the ramp up rate for a fourth soak test as in soak plot 425*b*. In graph 400, both the soak plot 420*c* and soak plot 425*b* represent soak tests that comply with the system requirement. From the soak tests, a second region 430 can be further defined from the first region 418 as a region of the system capacity candidate.

The capacity determination element 118 can determine the system capacity at a system capacity point 435 as a function of time within the second region 430 to determine the maximum transactions per second. The capacity determination element 118 can determine the system capacity point 435 based on the system requirement which can rank parameters of the system as more critical than others. For example, the capacity determination element 118 can choose the system capacity point 435 to be one of a center of the second region 430, a maximum transaction load of the second region 430, a minimum transaction load of the second region 430, a least amount of time of the second region 430, a greatest amount of time of the second region 430, a point on a plot line (e.g. soak plot 420*c*), and the like. In an example, the capacity determination element 118 can select, determine, calculate, and/or the like the system capacity point 435 in graph 400 to be a transaction load of 2000 transactions at a ramp up rate of 2000 transactions per 10 minutes which equals approximately 3 transactions per second. Using a plurality of different system capacity tests as described can reduce the number of tests to determine system capacity and increase accuracy of the system capacity test results.

Figure 5:
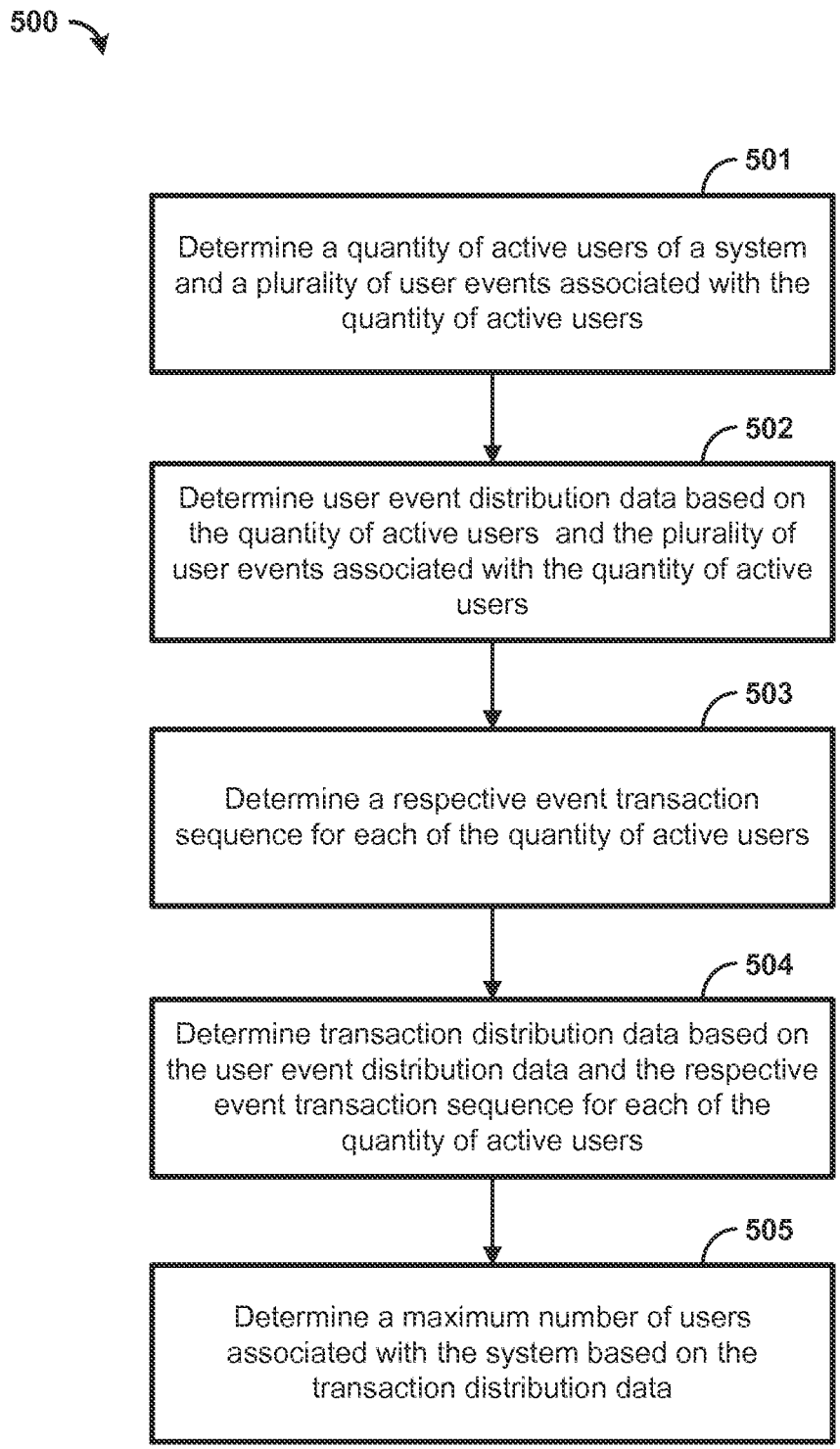
FIG. 5 is a flowchart illustrating an example method.

FIG. 5 is a flowchart illustrating another example method 500. In an aspect, the example method 500 can be used to determine system capacity in terms of maximum number of active users based on system capacity (e.g., transaction capacity and ramp up rate of transactions) determined by the example method 300. The maximum number of active users can be determined based on a plurality of user events driven by a quantity of active users and associating each of the plurality of user events with one or more transactions.

At step 501, a quantity of active users of a system and a plurality of user events associated with the quantity of active users can be determined. In an aspect, the plurality of user events associated with the quantity of active users can be categorized. For example, a quantity of active users on a specific website can perform a plurality of user events, such as performing a search, browsing, clicking next page, registering, logging in, and the like. As another example, a quantity of active users on a DVR service can perform a plurality of user events, such as deleting recordings, one-time recording, erasing recordings, series recordings, cancelling recordings, and undeleting recordings, and the like.

In an aspect, determining a quantity of active users of a system and a plurality of user events associated with the quantity of active users can comprise accessing a user event history data of the system (e.g., user event history 116). In an aspect, user event history data (e.g., user event data for past 7-14 days) of the quantity of active users can be collected by a log analyzer (e.g., Splunk).

At step 502, user event distribution data can be determined based on the quantity of active users and the plurality of user events associated with the quantity of active users. User event distribution data can be categorized such that the user event distribution data is grouped by a type of user event. For example, a quantity of active users on a specific website can perform a plurality of user events, such as performing a search, browsing, clicking next page, registering, logging in, and the like, which each can be categories of user events. In an aspect, the user event distribution data can be determined based on determining a percentage weight of user event categories for the quantity of active users. Accordingly, the percentage weight for each user event category can be calculated. In an aspect, the user event distribution data can be formatted as a matrix. An example of the user event distribution data for a DVR service is shown in Table 1. A user event distribution percentage weight can be generated by categorizing user events and calculating percentage weight of each category of user event over total user events performed by the quantity of active users. A mathematical formula to calculate the percentage weight of the user event categories can be written as: $P(E^m) = E^{(x)}/\text{Sum}(E^0 \sim E^m)$, wherein P represents percentage, and $E^x$ represents user events $E^1, E^2 \ldots E^m$, and m represents total number of user events.

TABLE 1

| | User Event | count (User Event) | Percentage |
|---|---|---|---|
| 1 | Delete Recordings | 966818 | 53% |
| 2 | One Time Recording | 403568 | 22% |
| 3 | Erase Recordings | 255838 | 14% |
| 4 | Series Recordings | 130752 | 7% |

TABLE 1-continued

| | User Event | count (User Event) | Percentage |
|---|---|---|---|
| 5 | Cancel Recordings | 56365 | 3% |
| 6 | Undelete Recordings | 13640 | 1% |

A user event can be a user operation. A user event can correspond to one or more predefined transactions. For example, a user event can correspond to a key transaction (KT). A key transaction can be used to identify a transaction that is the user event when the user event performs more than one transaction. In addition, a user event can correspond to one or more non-key transactions. As an illustration, a "one-time recording" user event can correspond to a key transaction of "record one shot." The "one-time recording" user event can also generate 2.5 "Get Recordings" transactions, and one "Get Recordings List" for a total of 4.5 transactions for one user event. Table 2 illustrates an example of a plurality of user events and respective predefined number of transactions associated with the plurality of user events.

TABLE 2

| | User Event | Transactions | count |
|---|---|---|---|
| 1 | Delete Recording | Delete Recordings (KT) | 1 |
| 2 | One-Time Recording | Record one shot (KT) | 1 |
| | | Get Recordings | 2.5 |
| | | Get Recordings List | 1 |
| 3 | Erase Recording | Erase Recordings (KT) | 1 |
| | | Get Recordings | 1 |
| 4 | Series Recording | Add Series (KT) | 1 |
| | | Retrieve Series | 3 |
| | | Get Recordings | 1 |
| | | Get Recordings List | 1 |
| 5 | Cancel Recording | Cancel schedules (KT) | 1 |
| | | Get Recordings | 1 |
| | | Get Recordings List | 1 |
| 6 | Undelete Recording | Undelete Recordings (KT) | 1 |

At step 503, a user event transaction sequence for each of the quantity of active users can be determined based on the quantity of active users and the plurality of user events associated with the quantity of active users. The user event transaction sequence can be referred as U-DNA. In an aspect, the user event transaction sequence for each of the quantity of active users can be determined by associating each of the plurality of the active user events with one or more predefined number of transactions. A mathematical formula to calculate a user event transaction sequence for each of the quantity of active users can be written as $U\text{-}DNA = E^0T_1, E^0T_2, E^0T_3 \ldots E^0T_n; E^1T_1, E^1T_2, E^1T_3 \ldots E^1T_n; E'''T_1, E'''T_2, E'''T_3 \ldots E'''T_n$, wherein E represents a user event, T represents a transaction, n represents a total number of types of transactions per event and in represents a total number of events. The user event transaction sequence can indicate a sequence of transactions for each of the plurality of user events performed one at a time.

In an aspect, determining an event transaction sequence for each of the quantity of active users can be based on a predefined number of users. Table 3 illustrates an example user event transaction sequence U-DNA based on 100 active users. A total transaction count with 100 active users caused by a plurality of user events are shown according to user event categories.

TABLE 3

| | User Event | # of events for 100 active users | Transactions | Transaction count per user event | Total transaction count (232) |
|---|---|---|---|---|---|
| 1 | Delete Recordings | 53 | Delete Recordings | 1 | 53 |
| 2 | One Time Recording | 22 | Record one shot | 1 | 22 |
| | | | Get Recordings | 2.5 | 55 |
| | | | Get Recordings List | 1 | 22 |
| 3 | Erase Recordings | 14 | Erase Recordings | 1 | 14 |
| | | | Get Recordings | 1 | 14 |
| 4 | Series Recordings | 7 | Add Series | 1 | 7 |
| | | | Retrieve Series | 3 | 21 |
| | | | Get Recordings | 1 | 7 |
| | | | Get Recordings List | 1 | 7 |
| 5 | Cancel Recordings | 3 | Cancel schedules | 1 | 3 |
| | | | Get Recordings | 1 | 3 |
| | | | Get Recordings List | 1 | 3 |
| 6 | Undelete Recordings | 1 | Undelete Recordings | 1 | 1 |

At step 504, transaction distribution data can be determined, generated, and/or the like based on the user event distribution data obtained at step 502 and the user event transaction sequence for each of the quantity of active users obtained at step 503. In an aspect, the transaction distribution data can be determined by aggregating transactions into categories and dividing each aggregated transaction category by total transactions. In an aspect, the transaction distribution data can be formatted as matrix. Table 4 illustrates an example transaction distribution data based on 100 active users. The user event distribution data can be generated by aggregating the transactions into categories (e.g., 9 categories). For example, all of the "Get Recording" transactions can be aggregated into a category regardless of what user event generated the "Get Recording" transaction. Then each aggregated transaction category can be divided by the total number of transactions (e.g., 232 transactions). The transaction distribution data can be written as percentage weighting P (U-DNA).

TABLE 4

| | Transactions | Count | Percentage Weighting |
|---|---|---|---|
| 1 | Get Recordings | 79 | 34.05% |
| 2 | Get Recordings List | 32 | 13.79% |
| 3 | Retrieve Series | 21 | 9.05% |

TABLE 4-continued

| | Transactions | Count | Percentage Weighting |
|---|---|---|---|
| 4 | Record One Shot | 22 | 9.48% |
| 5 | Delete Recordings | 53 | 22.84% |
| 6 | Erase Recordings | 14 | 6.03% |
| 7 | Add Series | 7 | 3.02% |
| 8 | Cancel Schedules | 3 | 1.29% |
| 9 | Undelete Recordings | 1 | 0.43% |

At step 505, a maximum number of active users associated with the system can be determined based on the transaction distribution data. In an aspect, determining an estimated maximum number of users associated with the system based on the transaction distribution data can comprise multiplying a performance parameter of the system and the transaction distribution data P (U-DNA). The performance parameter of the system can comprise a system capacity of ramp up rate of transactions per second (TPS). The performance parameter (e.g., system capacity) of the system can be determined by the example method 300 of FIG. 3.

Table 5 illustrates a maximum number of users ("estimated active users") associated with a DVR service in each key transaction (KT) category. The maximum number of users for each key transaction (KT) category can be calculated using U=Sum (KTs) of (TPS*P (U-DNA)), where U is the maximum number of users associated with the system. Key transactions (KT) can be labeled such that the maximum number of users in key transactions can be determined. The maximum number of users in each of the key transaction (KT) categories can be added, as shown in Table 5. TPS can be a transaction capacity of a DVR service. TPS can be determined by the method 300 described in FIG. 3. As an example, TPS=300 is used as an example in Table 5. The system capacity of maximum number of active users can be 129.

TABLE 5

| | Transactions | Count | Percentage Weighting | Transaction Per Second (TPS = 300) | Estimated Active users |
|---|---|---|---|---|---|
| 1 | Get Recordings | 79 | 34.05% | 102 | 0 |
| 2 | Get Recordings List | 32 | 13.79% | 41 | 0 |
| 3 | Retrieve Series | 21 | 9.05% | 27 | 0 |
| 4 | Record One Shot (KT) | 22 | 9.48% | 28 | 28 |
| 5 | Delete Recordings (KT) | 53 | 22.84% | 69 | 69 |
| 6 | Erase Recordings (KT) | 14 | 6.03% | 18 | 18 |
| 7 | Add Series (KT) | 7 | 3.02% | 9 | 9 |
| 8 | Cancel Schedules (KT) | 3 | 1.29% | 4 | 4 |
| 9 | Undelete Recordings (KT) | 1 | 0.43% | 1 | 1 |
| | | | | Total | 129 |

Figure 6:
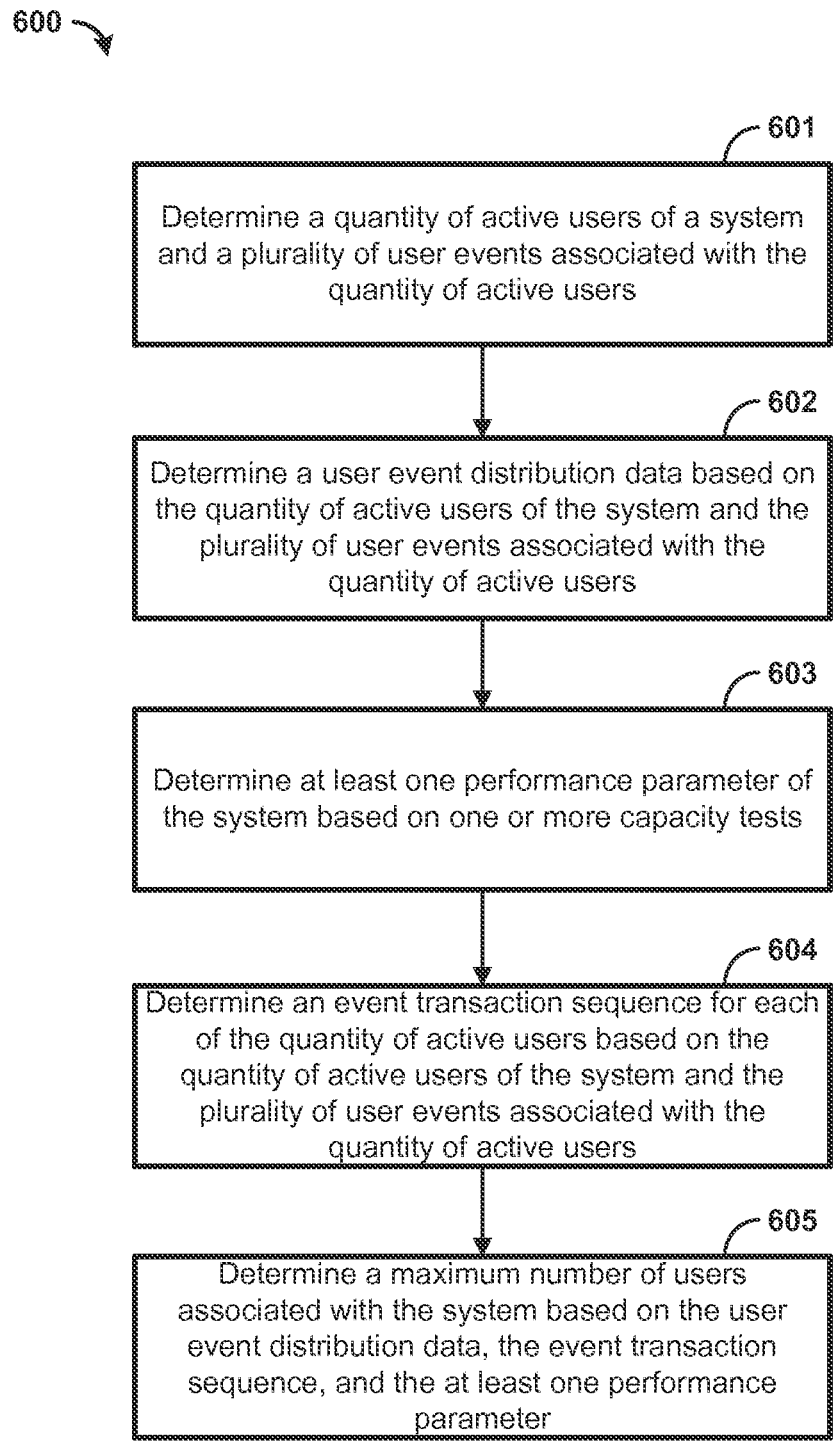
FIG. 6 is a flowchart illustrating an example method.

FIG. 6 is a flowchart of an example method 600. At step 601, a quantity of active users of a system and a plurality of user events associated with the quantity of active users can be determined. In an aspect, the plurality of user events associated with the quantity of active users can be categorized. For example, a quantity of active users on a specific website can perform a plurality of user events, such as performing a search, browsing, clicking next page, registering, logging in, and the like. As another example, a quantity of active users on a DVR service can perform a plurality of user events, such as deleting recordings, one-time recording, erasing recordings, series recordings, cancelling recordings, undeleting recordings, and the like.

In an aspect, determining a quantity of active users of a system and a plurality of user events associated with the quantity of active users can comprise accessing a user event history of the system (e.g., user event history 116). As an example, user event history data (e.g., user event data for the past 7-14 days) of the quantity of active users can be received by a log analyzer (e.g., Splunk).

At step 602, user event distribution data (CED) can be determined based on the quantity of active users of the system and the plurality of active user events associated with the quantity of active users. In an aspect, the CED can be catezorized. In an aspect, the CED can be formatted as a matrix. In an aspect, the CED can indicate that each active user event can correspond to multiple transactions. The CED can be a summary tabulated from active user events, transaction names, and transaction counts associated with the active user events.

In an aspect, the user event distribution data can be determined based on determining a percentage weight of user events for the quantity of active users. The percentage weight of the user event distribution can be generated by categorizing user events and calculating percentage weight of each type of user event over total user events performed by the quantity of active users. A mathematical formula to calculate the percentage weight of the user events can be written as: $P(E^m) = E^{(x)}/\text{Sum}(E^0 \sim E^m)$, where P represents percentage, and $E^x$ represents user events $E^1, E^2 \ldots E^m$, and m represents total number of user events.

A user event can be a user operation. A user event can correspond to one or more predefined transactions. For example, a user event can correspond to a key transaction (KT). A key transaction can be used to identify a transaction that represents the user event when a user event comprises more than one transaction. In addition, a user event can correspond to one or more non-key transactions. For example, a "one-time recording" user event can correspond to a key transaction of "record one shot." The "one-time recording" user event can also generate 2.5 "Get Recordings" transactions, and one "Get Recordings List" for a total of 4.5 transactions for one user event.

At step 603, at least one performance parameter of the system capacity can be determined according to the user event distribution data. As an example, the at least one performance parameter can be in terms of transaction per seconds (TPS). The at least one performance parameter of the system can be determined based on one or more of capacity tests, such as steady state test, spike test, transient test, soak test, and/or the like. The at least one performance parameter can be determined by the example method 300 of FIG. 3. The at least one performance parameter can comprise a system capacity.

At step 604, an event transaction sequence for each of the quantity of active users can be determined. The event transaction sequence can be based on the quantity of active users of the system and the plurality of user events associated with the quantity of active users. The event transaction sequence can be referred as U-DNA. In an aspect, the user transaction sequence for each of the quantity of active users can be determined by associating each of the plurality of the active user events with one or more predefined number of transactions. A mathematical formula to calculate an event transaction sequence for each of the quantity of active users can be written as U-DNA=$E^0T_1, E^0T_2, E^0T_3 \ldots E^0T_n; E^1T_2,$ $E^1T_3 \ldots E^1T_n$; $E^mT_1, E^mT_2, E^mT_3 \ldots ET_n$, wherein E represents a user event, T represents a transaction, n represents a total number of transactions per event, and m represents a total number of user events. The event transaction sequence can indicate a sequence of transactions for each of the plurality of user events performed one at a time. In an aspect, determining an event transaction sequence for each of the quantity of active users can be based on a predefined number of users.

In an aspect, transaction distribution data can be generated based on the user event distribution data and the event transaction sequence for each of the quantity of active users. In an aspect, the transaction distribution data can be determined by aggregating transactions into categories and dividing each aggregated transaction category by total transactions. The user event distribution data can be generated by aggregating the matching transactions from different user events into categories and dividing each aggregated transaction category by total number of transactions. The transaction distribution data can be written as percentage weighting P (U-DNA). In an aspect, the transaction distribution data can be formatted as a matrix.

At step 605, a maximum number of users associated with the system can be determined based on the user event distribution data, the event transaction sequence, and the at least one system capacity parameter. In an aspect, determining a maximum number of users associated with the system based on the transaction distribution data can comprise multiplying a performance parameter of the system determined at step 603 and the transaction distribution data P (U-DNA) determined at step 604. In an aspect, a maximum number of users for each key transaction category can be calculated using U=Sum (KTs) of (TPS*P (U-DNA)), where U is the maximum number of users associated with the system. Key transactions (KT) can be labeled such that a maximum number of users in key transactions can be determined. The maximum number of users in each of the key transaction categories can be added.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   determining, by a computing device, a first set of capacity test results by performing a first set of capacity tests of a computing system;
   determining a second set of capacity test results by performing a second set of capacity tests of the computing system, wherein the second set of capacity tests is different from the first set of capacity tests;
   determining a third set of capacity test results by performing a third set of capacity tests of the computing system, wherein the third set of capacity tests is different from the first set of capacity tests and the second set of capacity tests;
   calibrating one or more of the first set of capacity tests, the second set of capacity tests, or the third set of capacity tests based on the first set of capacity test results, the second set of capacity test results, or the third set of capacity test results;
   performing a fourth set of capacity tests using one or more of the first set of capacity test results, the second set of capacity test results, or the third set of capacity test results associated with the calibrated one or more of the first set of capacity tests, the second set of capacity tests, or the third set of capacity tests; and
   determining a computing system capacity based on a fourth set of capacity test results derived from the fourth set of capacity tests, the first set of capacity test results, the second set of capacity test results, and the third set of capacity test results.

2. The method of claim 1, wherein the first set of capacity tests determines a capacity ceiling of the computing system and a minimum ramp up rate of the computing system.

3. The method of claim 1, wherein the second set of capacity tests determines a capacity floor of the computing system.

4. The method of claim 1, wherein the third set of capacity tests determines a maximum ramp up rate of the computing system.

5. The method of claim 1, wherein the fourth set of capacity tests verifies a first region of the computing system capacity defined by the first set of capacity test results, the second set of capacity test results, and the third set of capacity test results.

6. The method of claim 5, wherein the fourth set of capacity, tests further defines the first region of the computing system capacity to a second region of the computing system capacity, wherein the second region has fewer possible computing system capacity candidates than the first region.

7. The method of claim 1, wherein the first set of capacity test results, the second set of capacity test results, the third set of capacity test results, and the fourth set of capacity test results are based on a predefined computing system requirement.

8. The method of claim 1, wherein the computing system capacity comprises one or more of a maximum capacity, a maximum transaction load, a maximum ramp up rate, a maximum computing system resource utilization, a maximum number of active users, a maximum number of transactions per second (TPS), or an optimal region for a predefined computing system requirement.

9. A method comprising:
   determining, by a computing device, a quantity of active users of a computing system and a plurality of user events associated with the quantity of active users;
   determining, based on the quantity of active users of the computing system and the plurality of user events associated with the quantity of active users, user event distribution data;
   determining a respective event transaction sequence for each active user of the quantity of active users;
   determining, based on the user event distribution data and the respective event transaction sequence for each active user of the quantity of active users, transaction distribution data; and
   determining, based on the transaction distribution data, a maximum number of users associated with the computing system.

10. The method of claim 9, wherein determining the quantity of active users of the computing system and the plurality of user events associated with the quantity of active users comprises accessing a user event history of the computing system.

11. The method of claim 9, wherein each user event of the plurality of user events is associated with a respective predefined number of transactions.

12. The method of claim 11, wherein determining the event transaction sequence for each active user of the quantity of active users comprises associating each user event of the plurality of user events with a respective predefined number of transactions.

13. The method of claim 9, wherein determining, based on the quantity of active users of the computing system and the plurality of user events associated with the quantity of active users, the user event distribution data comprises determining a percentage weight of user events for each active user of the quantity of active users.

14. The method of claim 9, wherein determining the event transaction sequence for each active user of the quantity of active users is based on a predefined number of users.

15. The method of claim 9, wherein determining, based on the user event distribution data, the maximum number of users associated with the computing system comprises multiplying a performance parameter of the computing system with the transaction distribution data.

16. The method of claim 15, wherein the performance parameter of the computing system comprises transactions per second (TPS) of the computing system.

17. A method comprising:
   determining, by a computing device, a quantity of active users of a computing system and a plurality of user events associated with the quantity of active users;
   determining, based on the quantity of active users of the computing system and the plurality of user events associated with the quantity of active users, user event distribution data;
   determining, based on one or more capacity tests, at least one performance parameter of the computing system;
   determining, based on the quantity of active users of the computing system and the plurality of user events associated with the quantity of active users, an event transaction sequence for each active user of the quantity of active users; and
   determining, based on the user event distribution data, the event transaction sequence, and the at least one performance parameter, a maximum number of users associated with the computing system.

18. The method of claim 17, wherein the at least one performance parameter of the computing system comprises a computing system capacity of transactions per second (TPS).

19. The method of claim 18, wherein the computing system capacity is determined by performing a plurality of capacity tests on the computing system, wherein a plurality of results of the plurality of capacity tests defines a region of computing system capacity by a capacity ceiling, a capacity floor, a maximum ramp up rate, and a minimum ramp up rate.

20. The method of claim 17, wherein determining, based on the quantity of active users of the computing system and the plurality of user events associated with the quantity of active users, the user event distribution data comprises determining a percentage weight of the user events for each active user of the quantity of active users.

* * * * *